(12) United States Patent
Sonobe et al.

(10) Patent No.: US 9,194,190 B2
(45) Date of Patent: Nov. 24, 2015

(54) THREADED JOINT FOR PIPE

(75) Inventors: Osamu Sonobe, Chiba (JP); Takuya Nagahama, Aichi (JP); Masaki Yoshikawa, Aichi (JP); Jun Takano, Aichi (JP); Takamasa Kawai, Aichi (JP); Kazunari Takahashi, Aichi (JP)

(73) Assignee: JFE STEEL CORPORATION, Tokyo (JP)

( * ) Notice: Subject to any disclaimer, the term of this patent is extended or adjusted under 35 U.S.C. 154(b) by 49 days.

(21) Appl. No.: 13/807,883

(22) PCT Filed: Jun. 22, 2011

(86) PCT No.: PCT/JP2011/064862
§ 371 (c)(1),
(2), (4) Date: Mar. 29, 2013

(87) PCT Pub. No.: WO2012/002409
PCT Pub. Date: Jan. 5, 2012

(65) Prior Publication Data
US 2013/0181442 A1    Jul. 18, 2013

(30) Foreign Application Priority Data

Jun. 30, 2010 (JP) ................. 2010-149547
Dec. 27, 2010 (JP) ................. 2010-289785
Apr. 28, 2011 (JP) ................. 2011-101329

(51) Int. Cl.
| F16L 15/00 | (2006.01) |
| E21B 17/042 | (2006.01) |
| F16L 15/06 | (2006.01) |

(52) U.S. Cl.
CPC .............. *E21B 17/042* (2013.01); *F16L 15/00* (2013.01); *F16L 15/004* (2013.01); *F16L 15/06* (2013.01)

(58) Field of Classification Search
USPC .................................. 285/333, 334
See application file for complete search history.

(56) References Cited

U.S. PATENT DOCUMENTS 4,588,213 A * 5/1986 Bollfrass et al. .............. 285/333
4,984,829 A    1/1991 Saigo et al.
(Continued)

FOREIGN PATENT DOCUMENTS

GB          1 220 856        1/1971
JP       Y2-61-044068      12/1986
(Continued)

OTHER PUBLICATIONS

International Search Report issued in International Application No. PCT/JP2011/064862 dated Jul. 26, 2011.
(Continued)

*Primary Examiner* — David E Bochna
(74) *Attorney, Agent, or Firm* — Oliff PLC

(57) ABSTRACT

A threaded joint for a pipe is disclosed in which scalability, compression resistance, and galling resistance are enhanced. The threaded joint includes a pin nose outer peripheral surface that forms an outward convex curve in an axial cross-sectional view; the convex curve is such that a composite R curve, in which a plurality of outward convex arcs having different radiuses of curvature are connected in sequence to a generating line of a cylindrical portion next to a male member, is curved such that the radiuses of curvature increase with distance from the male member and tangents on connection points of the arcs are aligned with those of corresponding arcs connected thereto; and the inner peripheral surface of a box component facing the pin nose is a tapered surface that interferes with the pin nose outer peripheral surface when connected to a pin component.

13 Claims, 3 Drawing Sheets

(56) References Cited

U.S. PATENT DOCUMENTS

| | | | |
|---|---|---|---|
| 5,137,310 A * | 8/1992 | Noel et al. ............ 285/333 |
| 5,769,466 A | 6/1998 | Noel et al. |
| 7,334,821 B2 * | 2/2008 | Dutilleul et al. ......... 285/333 |
| 8,070,191 B2 * | 12/2011 | Fujii ............... 285/333 |
| 8,641,100 B2 * | 2/2014 | Patureau et al. ......... 285/334 |
| 2004/0262919 A1 | 12/2004 | Dutilleul et al. |

FOREIGN PATENT DOCUMENTS

| | | |
|---|---|---|
| JP | B2-2705506 | 1/1998 |
| JP | A-2001-124253 | 5/2001 |
| JP | A-2002-522713 | 7/2002 |
| JP | B2-4208192 | 1/2009 |
| JP | B2-4300187 | 7/2009 |
| JP | B2-4535064 | 9/2010 |
| WO | WO 2009/083523 A1 | 7/2009 |

OTHER PUBLICATIONS

Feb. 27, 2015 Office Action issued in European Patent Application No. 11800871.3.

* cited by examiner ered in depth, and horizontal wells and directional wells are now more common than vertical wells, excavation and production environments are increasingly under harsh condition. Furthermore, an increase in well development under hostile environments, such as in ocean and polar regions has led to diversified performance requirements for threaded joints, such as compression resistance, bending resistance, and external pressure resistance. This therefore increases the use of high-performance special threaded joints called premium joints.

THREADED JOINT FOR PIPE

TECHNICAL FIELD

The present invention relates to a threaded joint for pipes and, more specifically, to a threaded joint for pipes having high sealability and high compression resistance which is suitable for use in connecting pipes for use generally in prospecting a well for oil or gas and in production, such as oil country tubular goods (OCTG) including tubing and casing, riser pipes, and line pipes.

BACKGROUND OF THE INVENTION

Threaded joints are widely used in connecting pipes for use in oil and gas production, such as oil well pipes. For the connection of pipes for use in oil or gas prospecting and production, standard threaded joints based on the American Petroleum Institute (API) standard are conventionally used. However, since crude oil wells and natural gas wells have recently increased in depth, and horizontal wells and directional wells are now more common than vertical wells, excavation and production environments are increasingly under harsh condition. Furthermore, an increase in well development under hostile environments, such as in ocean and polar regions has led to diversified performance requirements for threaded joints, such as compression resistance, bending resistance, and external pressure resistance. This therefore increases the use of high-performance special threaded joints called premium joints.

The premium joint is generally a joint composed of a pin component and a box component joined together, each including a tapered thread, a seal (specifically, a metal-to-metal seal), and a shoulder (specifically, a torque shoulder). The tapered thread has a key role in firmly securing the tubular joint, the seal ensures sealability due to the box component and the pin component coming into metal-contact at this portion, and the shoulder serves as a bearing face that acts as an abutment during the make-up of the joint.

FIGS. 2 to 4 are schematic explanatory diagrams of a premium joint for an oil well pipe, which are vertical cross-sectional views of a cylindrical threaded joint. The threaded joint includes a pin component 3 and a box component 1 corresponding thereto. The pin component 3 (pin 3) has a male member 7 at its outer surface and a no-threaded portion called a nose 8 (pin nose 8) at an end of the pin 3, which is provided next to the male member 7. The nose 8 has a seal 11 at the outer peripheral surface thereof and a torque shoulder 12 at the end face thereof. The opposing box component 1 has a female member 5, a seal 13, and a shoulder 14 at the inner surface, which are portions that can be screwed on or come into contact with the male member 7, the seal 11, and the shoulder 12 of the pin 3, respectively.

Examples of the related art of the foregoing premium joint are disclosed in Patent Literatures 1 to 6.

CITATION LIST

Patent Literature

PTL 1: Japanese Patent No. 4535064
PTL 2: Japanese Patent No. 4208192
PTL 3: Japanese Examined Utility Model Registration Application Publication No. 61-44068
PTL 4: Japanese Patent No. 4300187
PTL 5: Japanese Unexamined Patent Application Publication No. 2001-124253
PTL 6: Japanese Patent No. 2705506

In the example of FIGS. 2 to 4, the metal-to-metal seal is provided at an end of the pin nose 8. However, Patent Literature 1 proposes a threaded joint in which a metal-to-metal seal is provided at a portion of the pin nose 8 close to the threaded portion, and the nose extends lengthwise from the seal to the shoulder to increase external pressure resistance. The threaded joint disclosed in Patent Literature 1 is configured such that the pin nose, which is not in contact with the box component, extends lengthwise to be discontinuous to the seal and to avoid decreasing the thickness of the pin nose, to achieve enhancement of not only the external pressure resistance described above but also axial compression resistance.

Patent Literature 2 describes providing a portion having a shape discontinuous to the seal, called an appendix, from the seal to an end of the pin nose to ensure radial rigidity and decrease axial rigidity to deform the appendix during make-up and to enhance tension resistance due to its recovery under tensile load.

As described in Patent Literatures 1 and 2, placing the seal close to the threaded portion of the pin to separate it from the pin nose end is effective in enhancing external pressure resistance and tension resistance and in providing stable performance to the thread, which can also be confirmed by FEM simulation or the like. Furthermore, the pin nose discontinuous to the seal is deformed in itself when strong axial compression is exerted thereon, which also offers the effect of reducing the plastic deformation of the torque shoulder of the box component. However, on the other hand, the pin nose is likely to be improperly deformed, which may depend on the make up torque.

Since the make up torque is influenced by lubrication condition, surface properties, etc., a radial sealing method is proposed as a design that does not depend thereon to a large degree in which the radial component of seal contact pressure is relatively increased. For example, Patent Literature 3 discloses an example of a radial sealing method in which the pin seal has a large R shape and a small seal taper angle. However, a problem of such a radial sealing method in which the seal taper angle is small is that galling is prone to occur during make-up. In particular, in the case where a large sealing interference quantity is needed to ensure sealability and sealing stability, the susceptibility to the occurrence of galling further increases.

To solve the problems above, Patent Literature 4 increases a seal contact area to reduce contact pressure by defining the large radius of a toroidal sealing surface. This measure is effective, thus remarkably reducing the galling tendency of the metal-to-metal seal. However, there is a problem in the case where the contact pressure decreases due to minor trouble because the large R decreases the contact pressure, thus producing a minute leak path in the metal-to-metal seal and this leak is not easy to fix. Furthermore, it is physically difficult to separate the metal-to-metal seal from the nose end because of the large R, and thus, ensuring the distance between the metal-to-metal seal and the pin nose to a certain extent or longer results in an excessively small thickness of the pin nose end.

For axial compression performance, it is effective to reduce a stab flank side gap of the thread, as described in Patent Literature 5 or 6. However, if the gap is too small, galling is prone to occur at the thread, and thus an appropriate gap is needed.

The threaded joints proposed in the related art still have some problems as described above, and thus, there is room for further improvement to satisfactorily meet a variety of performance requirements for the compression resistance, bending resistance, external-pressure sealability, etc of threaded joints described above. Accordingly, it is an object of the present invention to provide a threaded joint for a pipe which is enhanced in terms of sealability, compression resistance, and galling resistance in view of such circumstances.

BRIEF SUMMARY OF THE INVENTION

The inventor and the associated person have made the present invention with the following context and configuration under diligent examination to find means for solving the problems above. That is, the present invention is as follows:
(1) A threaded joint for a pipe, comprising:
 a pin component including a male member, a nose extending to a pipe end from the male member, and a shoulder provided at an end of the nose; and
 a box component including a female member screwed onto the male member, an inner peripheral surface facing the outer peripheral surface of the nose of the pin component, and a shoulder that contacts the shoulder of the pin component,
 wherein the pin component and the box component are connected by the screw connection so that the nose outer peripheral surface of the pin component and the inner peripheral surface of the box component come into metal-to-metal contact so that the contact interface forms a seal surface, wherein
 the nose outer peripheral surface of the pin component forms an outward convex curve in the axial cross sectional view of the pin component, and the convex curve is such that a composite R curve, in which a plurality of outward convex arcs having different radiuses of curvature, Rs, are connected in sequence to a generating line of a cylindrical portion next to the male member, is curved such that the radiuses of curvature, Rs, of the arcs increase with distance from the male member and tangents on connection points of the arcs are aligned with those of corresponding arcs connected thereto; and the inner peripheral surface of the box component is a tapered surface that interferes with the nose outer peripheral surface of the pin component when connected to the pin component.
(2) The threaded joint for a pipe according to (1), wherein angles that the individual arcs in the composite R curve form increase with decreasing distance from the male member.
(3) The threaded joint for a pipe according to (1) or (2), wherein any of the connection points in the composite R curve serve as a start point of contact with the tapered surface.
(4) The threaded joint for a pipe according to any one of (1) to (3), wherein an angle that the tapered surface forms with respect to the axial direction of the joint is within ten degrees.
(5) The threaded joint for a pipe according to any one of (1) to (4), wherein the nose of the pin component has a length of 20 mm or more.
(6) The threaded joint for a pipe according to any one of (1) to (5), wherein the stab flank angles of the male member and the female member are within the range of zero degrees to 30 degrees.
(7) The threaded joint for a pipe according to any one of (1) to (6), wherein the load flank angles of the male member and the female member are within the range of −5 degrees to four degrees.
(8) The threaded joint for a pipe according to any one of (1) to (7), wherein the shoulder angle of the shoulder is within the range of zero degrees to 20 degrees.
(9) The threaded joint for a pipe according to any one of (1) to (8), wherein the thread gap between the male member and the female member is within the range of 0.01 mm to 0.1 mm.
(10) A threaded joint for a pipe, wherein the composite R curve in which a plurality of arcs having different radiuses of curvature, Rs, are connected in sequence to the generating line of the cylindrical portion next to the male member in any one of (1) to (9) is replaced with a composite R curve in which a plurality of arcs having different radiuses of curvature, Rs, are connected in sequence to the generating line of the cylindrical portion next to the male member directly or via line segments having a length of 2.5 mm or less.
(11) A threaded joint for a pipe, wherein the composite R curve in which a plurality of arcs having different radiuses of curvature, Rs, are connected in sequence to the generating line of the cylindrical portion next to the male member in any one of (1) to (9) is replaced with a composite R curve in which a plurality of arcs having different radiuses of curvature, Rs, are connected in sequence to the generating line of the cylindrical portion next to the male member directly or via an arc having a length of 2.5 mm or less and a radius of 250 mm or more and three times or more of the radius of an adjacent arc.

The present invention can provide a threaded joint for a pipe in which sealability, compression resistance, and galling resistance are enhanced.

BRIEF DESCRIPTION OF THE DRAWINGS

FIG. 1(*b*) is a box component 1 of cross-sectional view showing a nose of a threaded joint for a pipe according to an embodiment of the present invention.

FIG. 1(*c*) shows a state in which the pin component 3 and the box component 1 are joined together of cross-sectional view showing a nose of a threaded joint for a pipe according to an embodiment of the present invention.

DETAILED DESCRIPTION OF THE INVENTION

As described above, providing the seal at a position away from the nose end to extend the nose from the seal to the shoulder is effective in enhancing the external pressure resistance and the tension resistance and providing the thread with stable performance. Thus, the inventor and an associated person made a further consideration of the shape around the seal to separate the seal from the nose end (or the shoulder) and to prevent the thickness of the pin nose end from becoming too small.

As a result, we have drawn the conception that the nose outer peripheral surface of the pin component forms an outward convex curve in the axial cross sectional view of the pin component; the inner peripheral surface of the box component facing the nose outer peripheral surface of the pin component is a tapered surface that intersects the convex curve of the pin component at two points in the axial cross-sectional view of the box component; the nose outer peripheral surface of the pin component and the inner peripheral surface (hereinafter also referred to as a tapered surface) of the box component facing the nose outer peripheral surface form a metal-to-metal seal; and in the case where the pin component side interfaces and the box component side interface of the seal serve as the sealing surfaces of the components, the convex curve of the pin component is such that a composite R curve, in which a plurality of arcs having different radiuses of curvature, Rs, are connected in sequence to a generating line of a cylindrical portion next to the male member, is curved such that the radiuses of curvature, Rs, of the arcs increase with distance from the male member and tangents on connection points of the arcs are aligned with those of corresponding arcs connected thereto; and thus, the seal can be separated from the nose end without decreasing the thickness of the pin nose end.

Figure 1A:
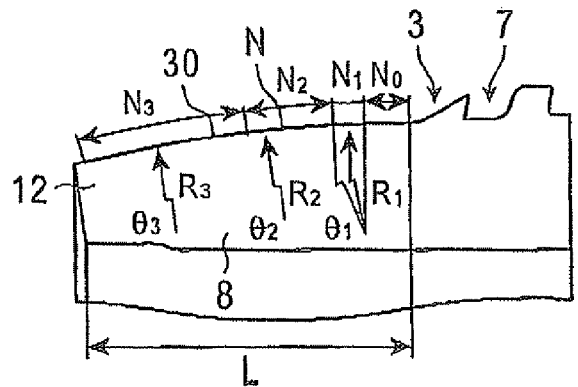
FIG. 1(*a*) is a pin component 3 of cross-sectional view showing a nose of a threaded joint for a pipe according to an embodiment of the present invention.
Figure 1B:
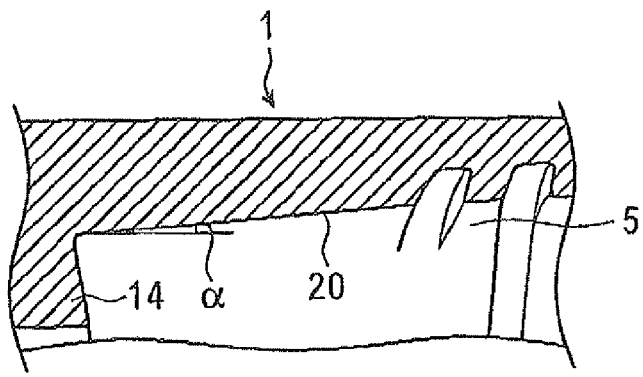
Figure 1C:
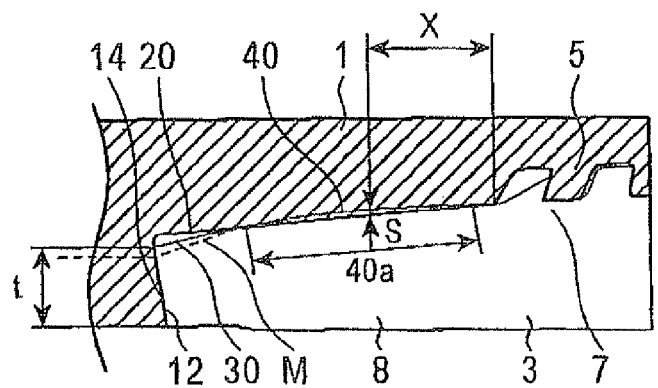
Figure 2:
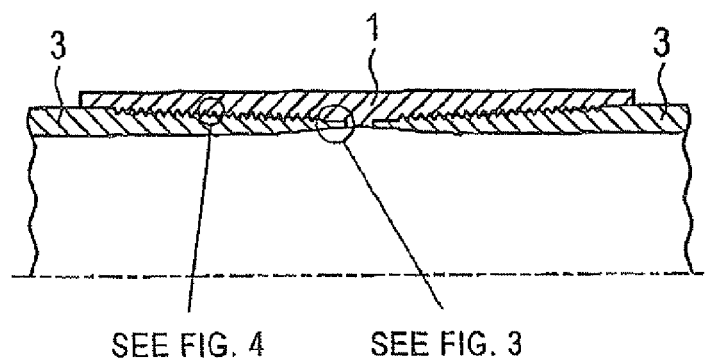
FIG. 2 is a cross-sectional view showing a conventional threaded joint for a pipe.
Figure 3:
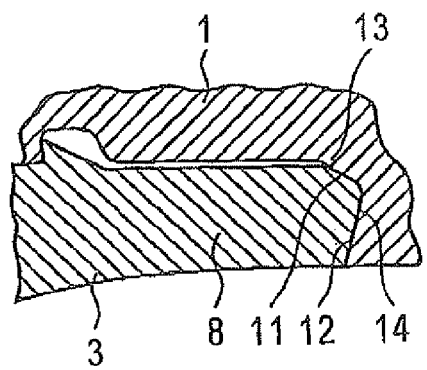
FIG. 3 is an enlarged cross-sectional view showing the vicinity of a pin nose in FIG. 2.
Figure 4:
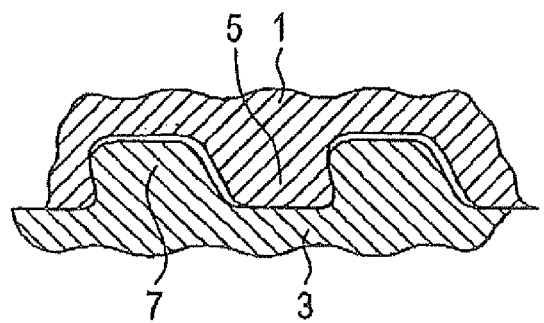
FIG. 4 is an enlarged cross-sectional view showing a thread portion in FIG. 2.

FIG. 1(a), FIG. 1(b) and FIG. 1(c) is a cross-sectional view showing a nose of a threaded joint for a pipe according to an embodiment of the present invention, in which (a) shows a pin component 3, (b) shows a box component 1, and (c) shows a state in which the pin component 3 and the box component 1 are joined together. The pin component 3 is provided at an end of a pipe and includes a male member 7, a nose 8 that continues to the pipe side from the male member 7, and a torque shoulder 12 provided at an end of the nose 8. On the other hand, the box component 1 includes a female member 5 screwed on the male member 7 of the pin component 3, a tapered surface 20 which is the inner peripheral surface of the box component 1 facing the outer peripheral surface of the nose 8 (nose outer peripheral surface 30) in the state in which the pin component 3 and the box component 1 are joined by the screw connection, and a shoulder 14 that comes into contact with the shoulder 12.

The nose outer peripheral surface 30 has an external convex curve in the axial cross-sectional view of the pin component 3. On the other hand, the inner peripheral surface of the box component 1 facing the nose outer peripheral surface 30 forms a tapered surface 20 (conical surface) having a fixed inclination (referred to as a taper angle) α with respect to the axial direction of the threaded joint. When the pin component 3 and the box component 1 are joined together, the tapered surface 20 and the nose outer peripheral surface 30 interfere with each other to form a seal 40. The taper angle α is set so that the convex curve and the generating line of the tapered surface 20 intersect at two points in the axial cross-sectional view of the threaded joint in an imaginary make up stage without interference between the pin component 3 and the box component 1, and the seal 40 is actually formed in a range (interference area 40a) between the two intersection points.

The convex curve formed along the nose outer peripheral surface 30 will be described using the composite R curve composed of three arcs shown in FIG. 1(a). This curve is a composite R curve N in which arcs $N_1$, $N_2$, and $N_3$ having different radiuses of curvature, $R_1$, $R_2$, and $R_3$, are connected in sequence to a line segment $N_0$ which is a generating line of a cylindrical portion next to the male member 7. This composite R curve N has a curved shape in which the radiuses of curvature of the arcs increase with distance from the male member 7, that is, $R_1<R_2<R_3$. This allows the thickness of the shoulder 12 (shoulder thickness) t at the end of the pin nose 8 to be increased. For comparison, FIG. 1(c) shows, in a broken line, a case in which the convex curve is a single R curve M (a single arc with a radius of curvature, R), and the interference area of its seal is equal to the interference area 40a of the seal 40 of the composite R curve N. This shows that, with such a single R curve M, the shoulder thickness is smaller as compared with the case of the composite R curve N. The small shoulder thickness causes insufficient rigidity of the pin nose 8, which precludes the contact pressure of the seal 40 from being properly ensured. In contrast, an attempt to ensure a sufficient shoulder thickness with a single R curve causes the seal 40 to be distant from the male member 7, which is undesirable from the viewpoint of securing sufficient external pressure resistance and tension resistance.

The composite R curve N has a curved shape such that a tangent on a connection point of an arc and that of a connected arc are aligned with each other. For example, at a connection point between the arcs $N_1$ and $N_2$ and at a connection point between the arcs $N_2$ and $N_3$, the tangents of the arcs that are connected together are aligned with each other. Accordingly, the convex curve is shaped in a continuous curve on which no refracting point is present, which reduces improper deformation of the nose. The arcs to be connected may be directly connected, or alternatively, connected via a line segment aligned with a common tangent to the arcs or an arc with a sufficient radius (a radius of 250 mm or more and three times or more as that of an adjacent arc) for which there is no need to consider angle changes. To ensure contact pressure under which no leak path is formed, it is preferable to set the length of the line segment or an arc with a sufficient radius described above to 2.5 mm or less.

Here, it is preferable that angles $\theta_1$, $\theta_2$, and $\theta_3$ that the arcs $N_1$, $N_2$, and $N_3$ form, respectively, increase with decreasing distance from the male member 7, that is, $\theta_1>\theta_2>\theta_3$. Otherwise, it is difficult to design the composite R curve within a limited length of the nose 8 of the pin component 3 (the length L of the pin nose in FIG. 1(a)) or a limited length of the interference area 40a (referred to as a seal contact length).

Furthermore, it is preferable that any of the connection points in the composite R curve, for example, a connection point between the arcs $N_1$ and $N_2$, and a connection point between the arcs $N_2$ and $N_3$, is aligned with a contact start point that indicates a point at which the composite R curve first comes into contact with the tapered surface 20 of the box component 1. By setting any of the connection points of the arcs in the composite R curve to the contact start point, a portion having a large R, a low contact pressure, and a long contact length and a portion having a small R, a high contact pressure, and a short contact length are formed on the contact pressure distribution of the seal, thereby reducing the tendency to produce a leak path, thus enhancing the sealability.

However, in practice, it is sometimes difficult to completely align the contact point of the arcs with the start point of contact with the tapered surface of the box component because of the manufacturing tolerance of a thread cutting device. In this case, the inclination of a tangent at the connection point of the arc may be set smaller than the inclination of the tapered surface of the box component by 0.5 degree at the maximum. In actual make-up, a deformation such that the end of the pin tapers off occurs due to the radial interference of the pin and the box, which makes the inclination of a tangent to the pin surface at completion of make-up larger than a designed value. Therefore, setting the inclination of a tangent at the contact point of the arc to a value smaller than the inclination of the taper of the box component by 0.5 degrees or less has substantially the same effect as that when the inclinations agree.

It is preferable that the distance between the contact start point and the end of the male member, x, (see FIG. 1(c)) is less than 0.7L (L is the length of the pin nose, as described above) in the viewpoint of separating the seal from the nose end, and if the distance between the contact start point and the end of the male member is less than 0.2L, the interference between the seal and the thread is prone to occur, and thus, it is preferable to be 0.2L or more. To ensure safety, it is preferable to be 0.3L or more.

It is preferable that the taper angle α of the tapered surface 20 of the box component 1 be within ten degrees. By setting the taper angle α (see FIG. 1(b)) within ten degrees, and more preferably, within five degrees, the radial sealing method can be appropriately achieved, and thus, the make up torque dependence on the sealability is relatively decreased.

It is preferable that the length L of the pin nose (see FIG. 1(c)) be 20 mm or more. This can sufficiently separate the seal from the end of the pin nose, and as a result, can significantly reduce damage to the seal owing to an elastic deformation within the range of separation distance, thus offering the effect of stabilizing the sealability.

The stabilized sealability allows a sealing interference quantity S (see FIG. 1(c)) to be relatively small for the radial sealing method, thus reducing galling tendency.

Of the two or more Rs in the composite R curve, a relatively small R is preferably set to one inch or less, a relatively large R is more preferably set to two inches or more, and a further larger R is preferably set to three inches or more. More specifically, at least one of the plurality of Rs of the composite R curve is preferably set to two inches or more (more preferably, three inches or more), and the remaining Rs are preferably set to less than two inches (more preferably, one inch or less). By setting at least one of the plurality of Rs of the composite R curve preferably to two inches or more (more preferably, three inches or more), the contact length of the seal can easily be ensured, and by setting the remaining Rs preferably to less than two inches (more preferably, one inch or less), high contact pressure can easily be achieved.

The number of arcs in the composite R curve (the number of arcs having different Rs) may be two or three shown in FIG. 1(a), or alternatively, four or more. Although the increase in the number of arcs increases the seal contact length, thus facilitating enhancement of the sealability, the number of arcs may be designed in accordance with performance actually required for the threaded joint because actual production load and labor, such as size checking, increases.

Furthermore, it is preferable to set the cross-sectional area of the pin component at the contact start point to 35% or higher of the cross-sectional area of the main body of a pipe at the end of which the joint is formed (the cross-sectional area of an unprocessed-pin portion). By setting such a cross-sectional area of the pin, the rigidity of the pin component at the contact start point is increased, and in particular, high external pressure resistance is easily obtained. Preferably, the cross-sectional area of the pin component at the contact start point is set to 40% or more of the cross-sectional area of the pipe main body.

Figure 5:
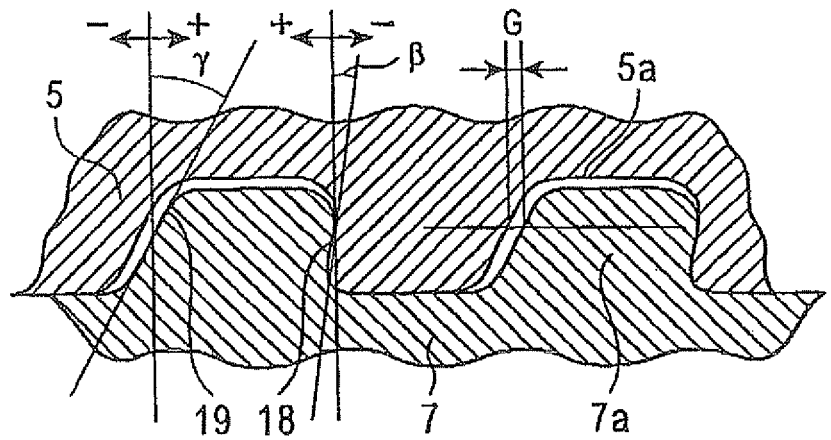
FIG. 5 is a cross-sectional view showing the definitions of a thread gap, a load flank angle, and a stab flank angle.

It was confirmed that defining one or two or more of the load flank angle, the stab flank angle, and the thread gap of the male member and the female member within desirable ranges, in addition to the limitation to the shape around the seal, described above, enhances the overall sealability due to the combination effect. Here, the load flank angle is a load flank angle β shown in FIG. 5, that is, an angle β that a load flank surface 18 forms with a thread-axis orthogonal surface (a surface orthogonal to the axial direction of the threaded joint, ditto for the following). The stab flank angle is a stab flank angle γ shown in FIG. 5, that is, an angle γ that a stab flank surface 19 forms with the thread-axis orthogonal surface. The thread gap is a gap G shown in FIG. 5, that is, the gap G between a thread ridge 7a of the male member and a thread groove 5a of the female member that engages therewith.

The optimum range of the load flank angle β is from −5 degrees to four degrees. The lower limit of the optimum range is determined from the viewpoint of the galling resistance and the tool life of the thread, and the upper limit is determined from the viewpoint of the bending resistance.

The optimum range of the stab flank angle γ is from zero degrees to 30 degrees. The lower limit of the optimum range is determined from the viewpoint of the galling resistance, the tool life, and the make up performance of the thread, and the upper limit is determined from the viewpoint of axial compression resistance.

The optimum range of the thread gap G is from 0.01 to 0.1 mm. The lower limit is determined from the viewpoint of reducing the galling tendency, and the upper limit is determined from the viewpoint of reducing load on the end of the pin under axial compression load. The thread gap G is preferably at least about 0.03 mm in consideration of a lead error during threading. Because of the realization that the thread gap G of about 0.045 mm offers sufficient performance, it may be about 0.045 mm depending on circumstances.

The overall sealability enhancing effects owing to the determination of one or two or more of the load flank angle, the stab flank angle, and the thread gap as described above are prominent particularly under the condition that the axial tension+internal pressure or external pressure once the axial compression is exerted are loaded.

The shoulder angle of the shoulder (an angle that the end face of the shoulder in the axial direction of the joint forms with a joint-axis orthogonal surface, which is assumed to be a positive angle in the case where the pin outer periphery side of the interface projects outwards with respect to the pin inner periphery side) is preferably from zero degrees to 20 degrees. A shoulder angle of less than zero degrees is unfavorable for sealability and make-up characteristics. On the other hand, a shoulder angle of more than 20 degrees is unfavorable because plastic deformation of the box shoulder and local deformation of the seal tend to occur. Preferably, it is 15 degrees or lower. Furthermore, it is preferably seven degrees or lower depending on the circumstances.

EXAMPLES

An evaluation was made of a threaded joint for a pipe according to the present invention shown in FIG. 1 or in which two of the arcs of the composite R curve in FIG. 1(a) are connected via a line segment. Table 1 and 2 shows the sizes, shapes and evaluation results of examples of the present invention and comparative examples. All the pin components were formed at ends of pipes with an external diameter of 244.48 mm and a wall thickness of 13.84 mm. The threads have 5 TPI (five threads per inch). A leak test based on ISO 13679: 2002 was simulated as evaluation by FEM analysis, in which the contact pressure area (ksi·inch) of the seal was evaluated. The contact pressure area is obtained by integrating the contact pressure with the seal contact area. This leak test is a load test on a threaded joint for a pipe based on a biaxial stress corresponding to 95% of material yield conditions, an inner pressure, a smaller one of a biaxial stress corresponding to the collapse conditions described in ISO 10400: 2007 and a biaxial stress corresponding to 95% of material yield conditions, and an external pressure, which are imposed in the schedule shown in FIG. 6.

As an index indicating galling tendency during make-up, a galling index (psi·inch)=contact pressure×sliding distance was obtained by FEM analysis, which is defined by the product of the sliding distances (sliding distances)(inch) and the contact pressures (psi) at the individual axial positions of the seal from the start of make-up to the end. This is also obtained by integration. In general, the smaller the galling index, the smaller the galling tendency.

For comparison purposes, contact pressure areas and galling indexes were determined for:

Comparative Examples 1, 3, 4: The generating line of the outer peripheral surface of the pin nose 8 has the form of a convex curve having a single R (the single R curve M indicated by the broken line in FIG. 1(c)).

Comparative Example 2: The generating line of the outer peripheral surface of the pin nose 8 is a composite R curve, but the requirement that the Rs of the arcs increase with distance from the male member 7 is not satisfied.

Furthermore, for these examples of the present invention and comparative examples, a plurality of samples with different seal interference quantities, with a thread interference quantity of 0.305 mm per diameter, were prepared, and a physical test was conducted using a testing method specified by ISO 13679: 2002. Furthermore, a plurality of samples with different seal interference quantities, with a thread interference quantity of 0.127 mm per diameter, were prepared, and a 13-time repeated make-up test was conducted 13. Thus, the minimum seal interference quantity at which no leak occurred in the physical test and the maximum seal interference quantity at which no galling occurred during the 13 times of make-up in the repeated make-up test were determined by the tests, and the difference therebetween was determined to be a settable seal interference quantity range.

Table 1 and 2 shows, in addition to the sizes of the individual components of the threaded joints, the contact pressure areas and galling indexes obtained by FEM calculation and the maximum and minimum seal interference quantities determined by the actual physical test and the repeated make-up test. Here, the seal interference quantities on Table 1 and 2 are values per diameter, which correspond to the seal interference quantity S×2, shown in FIG. 1(c). The contact pressure areas under the inner pressure condition in the FEM calculation in all the examples were the minimum values (corresponding to a state in which leak is most prone to occur) in the vicinity of load steps L3 and L18 (biaxial tension stress+inner pressure) in the schedule in FIG. 6. Although the load point is not specified in ISO 13679, it is the most severe condition for the inner pressure+tension conditions and is sometimes needed, and thus, it was used here for comparison.

Figure 6:
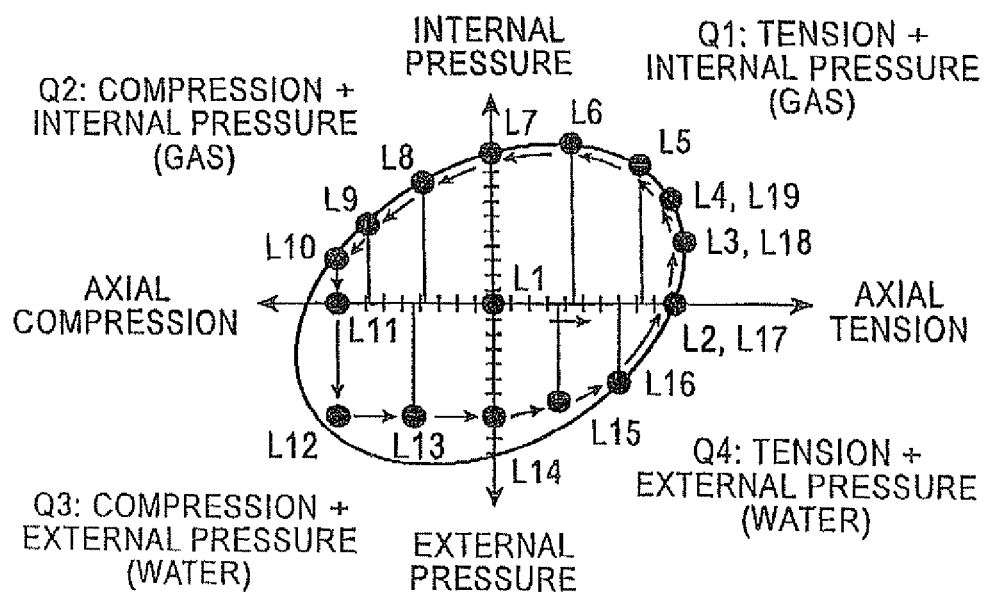
FIG. 6 is a figure showing a load schedule in a simulation of the leak test.

On the other hand, the contact pressure areas under the external pressure conditions in the FEM calculation in all the examples were the minimum values in the vicinity of a load step L15 (biaxial tension stress+external pressure) in the schedule in FIG. 6. Table 1 and 2 shows the minimum values of the contact pressure areas in the individual examples as relative minimum values. Here, the inner pressure is loaded with gas and the external pressure is loaded with water, and thus, susceptibility to leakage differs; therefore, relative minimum values were obtained with reference to the respective minimum values under the inner pressure condition and the external pressure condition. Specifically, for the minimum value at L3 and L18, the smallest minimum value in all the examples for L3 and L18 was set at 100, and other others were expressed as ratios thereto. For the minimum value at L15, the smallest minimum value in all the examples for L15 was set at 100, and the others were expressed as ratios thereto.

The load step L18 after compression hysteresis was once subjected exhibited sealability lower than the sealability at the load step L3, which is the same load point as that before the compression hysteresis was subjected, which is significant in, in particular, Comparative Example 3 in which no sufficient shoulder thickness. In all results, the examples of the present invention exhibited good sealability at L18 after being subjected to compression hysteresis.

For the galling index, a joint-axial position at which the maximum value (corresponding to a state in which the galling tendency is the highest) differed from example to example. Table 1 and 2 shows the maximum values of the galling indexes of the individual examples as relative maximum values (the maximum value in all the examples is set at 100, and the others are expressed as ratios thereto).

Table 3 shows evaluation results with other sizes. Object materials have an outside diameter of 139.7 mm, a wall thickness of 7.72 mm, and 5 TPI and have an outside diameter of 346.08 mm, a thickness of 15.88 mm, and 4 TPI. Examples of the present invention exhibited good sealability after being subjected to compression hysteresis and high galling performance during make-up with all sizes.

The evaluation results shown on Tables 1, 2 and 3 show that the examples of the present invention achieved threaded joints having galling indexes smaller than or equal to the comparative examples and having wide settable seal interference quantity ranges wide and high sealability and galling resistance although the contact pressure areas (contact pressure areas) were higher.

TABLE 1

| | | Invention Example 1 | Invention Example 2 | Invention Example 3 | Invention Example 4 |
|---|---|---|---|---|---|
| Size | outside diameter (mm) | 244.48 | 244.48 | 244.48 | 244.48 |
| | wall thickness (mm) | 13.84 | 13.84 | 13.84 | 13.84 |
| Seal | outer peripheral shape of pin component | composite R (3 arcs) R1 = 0.8 inch θ1 = 4.0 degrees R2 = 2.4 inches θ2 = 3.5 degrees R3 = 4.8 inches θ3 = 2.5 degrees | composite R (3 arcs) R1 = 1.0 inch θ1 = 2.5 degrees R2 = 3.0 inches θ2 = 2.2 degrees R3 = 10.0 inches θ3 = 1.5 degrees | composite R (2 arcs) R1 = 1.0 inch θ1e = 4.7 degrees R2e = 3.0 inches θ2e = 2.0 degrees | composite R (3 arcs) R1 = 2.0 inches θ1 = 4.7 degrees R2 = 5.0 inches θ2 = 2.0 degrees R3 = 10.0 inches θ3 = 1.33 degrees 0.66-inch line segment between R1-R2 |
| | inner peripheral shape of box component | tapered surface α = 4.7 degrees | tapered surface α = 4.7 degrees | tapered surface α = 4.7 degrees | tapered surface α = 4.7 degrees |
| | seal interference quantity 2S | 0.030 inch | 0.030 inch | 0.030 inch | 0.030 inch |
| Contact start point | contact start position x/L | 0.48 (not aligned with connection point) | 0.51 (aligned with R2-R3 connection point) | 0.47 (aligned with R1-R2 connection point) | 0.51 (aligned with R2-R3 connection point) |
| | cross-sectional area ratio of pin body to unprocessed portion of | 32% | 32% | 32% | 32% |

TABLE 1-continued

| | | | | | |
|---|---|---|---|---|---|
| Nose | pin nose length L | 20.0 mm | 22.4 mm | 22.6 mm | 22.5 mm |
| Shoulder | shoulder thickness t | 4.18 mm | 4.49 mm | 4.44 mm | 4.54 mm |
| | shoulder angle | 15 degrees | 15 degrees | 15 degrees | 5 degrees |
| Thread portion | TPI (number of thread ridges/inch) | 5 TPI | 5 TPI | 5 TPI | 5 TPI |
| | load flank angle β | −5 degree | −5 degree | −5 degree | −5 degree |
| | stab flank angle γ | 25 degrees | 25 degrees | 25 degrees | 25 degrees |
| | thread gap G | 0.03 mm | 0.04 mm | 0.06 mm | 0.03 mm |
| Contact pressure area | L3 (internal pressure, relative minimum value) | 173 | 172 | 174 | 179 |
| | L18 (Internal pressure, relative minimum value) | 144 | 143 | 145 | 149 |
| | L15 (external pressure, relative minimum value) | 106 | 110 | 112 | 108 |
| Galling index (Relative maximum value) | | 85 | 84 | 85 | 83 |
| Seal interference quantity | minimum value | 0.020 | 0.020 | 0.019 | 0.018 |
| | maximum value | 0.046 | 0.046 | 0.046 | 0.047 |
| | settable range | 0.026 | 0.026 | 0.027 | 0.029 |

| | | | Invention Example 5 | Invention Example | Invention Example 7 |
|---|---|---|---|---|---|
| Size | | outside diameter (mm) | 244.48 | 244.48 | 244.48 |
| | | wall thickness (mm) | 13.84 | 13.84 | 13.84 |
| Seal | | outer peripheral shape of pin component | composite R (2 arcs) R1 = 1.0 inch θ1 = 4.7 degrees R2 = 3.0 inches θ2 = 3.1 degrees | composite R (2 arcs) R1 = 2.1 inches θ1 = 4.7 degrees R2 = 2.5 inches θ2 = 1.0 degrees | composite R (2 arcs) R1 = 1.0 inch θ1 = 4.7 degrees R2 = 3.0 inches θ2 = 2.0 degrees |
| | | inner peripheral shape of box component | tapered surface α = 4.7 degrees | tapered surface α = 4.7 degrees | tapered surface α = 4.7 degrees |
| | | seal interference quantity 2S | 0.030 inch | 0.032 inch | 0.030 inch |
| Contact start point | | contact start position x/L | 0.69 (aligned with R1-R2 connection point) | 0.50 (aligned with R1-R2 connection point) | 0.50 (aligned with R1-R2 connection point) |
| | | cross-sectional area ratio of pin body to unprocessed portion of | 32% | 32% | 36% |
| Nose | | pin nose length L | 20.3 mm | 25.0 mm | 25.0 mm |
| Shoulder | | shoulder thickness t | 4.93 mm | 4.39 mm | 4.94 mm |
| | | shoulder angle | 5 degrees | 10 degrees | 10 degrees |
| Thread portion | | TPI (number of thread ridges/inch) | 5 TPI | 5 TPI | 5 TPI |
| | | load flank angle β | −5 degree | −5 degree | −5 degree |
| | | stab flank angle γ | 25 degrees | 25 degrees | 25 degrees |
| | | thread gap G | 0.06 mm | 0.06 mm | 0.06 mm |
| Contact pressure area | | L3 (internal pressure, relative minimum value) | 126 | 169 | 182 |
| | | L18 (Internal pressure, relative minimum value) | 105 | 141 | 152 |
| | | L15 (external pressure, relative minimum value) | 105 | 114 | 134 |
| Galling index (Relative maximum value) | | | 80 | 93 | 84 |
| Seal interference quantity | | minimum value | 0.033 | 0.021 | 0.017 |
| | | maximum value | 0.048 | 0.043 | 0.046 |
| | | settable range | 0.015 | 0.022 | 0.029 |

TABLE 2

| | | Invention Example 8 | Invention Example 9 | Invention Example 10 | Comparative Example |
|---|---|---|---|---|---|
| Size | outside diameter (mm) | 244.48 | 244.48 | 244.48 | 244.48 |
| | wall thickness (mm) | 13.84 | 13.84 | 13.84 | 13.84 |
| Seal | outer peripheral shape of pin component | composite R (2 arcs) R1 = 1.0 inch θ1 = 4.5 degrees R2 = 3.0 inches θ2 = 2.0 degrees 0.06-inch line segment between R1-R2 | composite R (2 arcs) R1 = 1 inch θ1 = 4.5 R2 = 3 inches θ2 = 2.2 0.06-inch line segment between R1-R2 | composite R (2 arcs) R1 = 1.0 inch θ1 = 4.6 degrees R2 = 3.0 inches θ2 = 1.9 degrees arc with R = 15 inches and θ = 0.2 degrees between R1-R2 | single R (1 arc) R1 = 4.0 inches θ1 = 7.98 degrees |

TABLE 2-continued

|  |  |  |  |  |  |
|---|---|---|---|---|---|
|  | inner peripheral shape oof box component | tapered surface α = 4.7 degrees | tapered surface α = 4.9 degrees | tapered surface α = 4.7 degrees | tapered surface α = 4.7 degrees |
|  | seal interference quantity 2S | 0.030 inch | 0.030 inch | 0.030 inch | 0.030 inch |
| Contact start point | contact start position x/L | 0.50 (aligned with R1-R2 connection point) | 0.50 (not aligned with connection point) | 0.50 (not aligned with connection point) | 0.76 (no connection point) |
|  | cross-sectional area ratio of pin body to unprocessed portion of pin | 42% | 42% | 36% | 32% |
| Nose | pin nose length L | 25.0 mm | 25.0 mm | 25.0 mm | 24.1 mm |
| Shoulder | shoulder thickness t | 5.76 mm | 5.76 mm | 4.94 mm | 4.82 mm |
|  | shoulder angle | 10 degrees | 10 degrees | 10 degrees | 15 degrees |
| Thread portion | TPI (number of thread ridges/inch) | 5 TPI | 5TP1 | 5 TPI | 5 TPI |
|  | load flank angle β | −5 degree | −5 degree | −5 degree | −5 degree |
|  | stab flank angle γ | 15 degrees | 15 degrees | 15 degrees | 25 degrees |
|  | thread gap G | 0.06 mm | 0.06 mm | 0.06 mm | 0.11 mm |
| Contact pressure area | L3 (internal pressure, relative minimum value) | 188 | 192 | 182 | 120 |
|  | L18 (internal pressure, relative minimum value) | 157 | 160 | 152 | 100 |
|  | L15 (external pressure, relative minimum value) | 147 | 151 | 138 | 100 |
| Galling index (Relative maximum value) |  | 85 | 80 | 84 | 87 |
| Seal interference quantity | minimum value | 0.015 | 0.014 | 0.017 | 0.035 |
|  | maximum value | 0.046 | 0.048 | 0.046 | 0.045 |
|  | settable range | 0.031 | 0.034 | 0.029 | 0.010 |

|  |  |  | Comparative Example | Comparative Example | Comparative Example 4 |
|---|---|---|---|---|---|
|  | Size | outside diameter (mm) | 244.48 | 244.48 | 244.48 |
|  |  | wall thickness (mm) | 13.84 | 13.84 | 13.84 |
|  | Seal | outer peripheral shape of pin component | composite R (3 arcs) R1 = 5.0 inches θ1 = 3.0 degrees R2 = 3.0 inches θ2 = 1.7 degrees R3 = 2.5 inches θ3 = 2.65 degrees | single R (1 arc) R1 = 3.0 inches θ1 = 15.17 degrees | single R (1 arc) R1 = 5.0 inches θ1 = 6.0 degrees 0.18-inch line segment |
|  |  | inner peripheral shape oof box component | tapered surface α = 4.7 degrees | tapered surface α = 4.7 degrees | tapered surface α = 4.7 degrees |
|  |  | seal interference quantity 2S | 0.030 inch | 0.030 inch | 0.040 inch |
|  | Contact start point | contact start position x/L | 0.71 (aligned with R2-R3 connection point) | 0.49 (no connection point) | 0.73 (no connection point) |
|  |  | cross-sectional area ratio of pin body to unprocessed portion of pin | 32% | 32% | 32% |
|  | Nose | pin nose length L | 20.1 mm | 27.4 mm | 27.9 mm |
|  | Shoulder | shoulder thickness t | 4.72 mm | 3.14 mm | 4.62 mm |
|  |  | shoulder angle | 15 degrees | 15 degrees | 15 degrees |
|  | Thread portion | TPI (number of thread ridges/inch) | 5 TPI | 5 TPI | 5 TPI |
|  |  | load flank angle β | −5 degree | −5 degree | −5 degree |
|  |  | stab flank angle γ | 25 degrees | 25 degrees | 25 degrees |
|  |  | thread gap G | 0.09 mm | 0.09 mm | 0.09 mm |
|  | Contact pressure area | L3 (internal pressure, relative minimum value) | 130 | 150 | 152 |
|  |  | L18 (internal pressure, relative minimum value) | 100 | 100 | 127 |
|  |  | L15 (external pressure, relative minimum value) | 105 | 110 | 100 |
|  | Galling index (Relative maximum value) |  | 81 | 84 | 100 |
|  | Seal interference quantity | minimum value | 0.035 | 0.035 | 0.026 |
|  |  | maximum value | 0.048 | 0.046 | 0.040 |
|  |  | settable range | 0.013 | 0.011 | 0.014 |

TABLE 3

|  |  | Invention Example 11 | Comparative Example 5 | Invention Example 12 | Comparative Example 6 |
|---|---|---|---|---|---|
| Size | outside diameter (mm) | 139.70 | 139.70 | 346.08 | 346.08 |
|  | wall thickness (mm) | 7.72 | 7.72 | 15.88 | 15.88 |
| Seal | outer peripheral shape of pin component | composite R (3 arcs) R1 = 0.8 inch θ1 = 4.0 degrees R2 = 2.4 inch θ2 = 3.5 degrees R3 = 4.8 inches θ3 = 2.5 degrees | single R (1 arc) R1 = 4.0 inches θ1 = 7.98 degrees | composite R (2 arcs) R1 = 1.0 inch θ1 = 4.7 degrees R2 = 3.0 inches θ2 = 2.0 degrees 0.06-inch line segment between R1-R2 | single R (1 arc) R1 = 5.0 inches θ1 = 6.0 degrees 0.18-inch line segment |
|  | inner peripheral shape of box component | tapered surface α = 4.7 degrees | tapered surface α = 4.7 degrees | tapered surface α = 4.7 degrees | tapered surface α = 4.7 degrees |
|  | seal interference quantity 2S | 0.030 inch | 0.030 inch | 0.030 inch | 0.040 inch |
| Contact start point | contact start position x/L | 0.48 (not aligned with connection point) | 0.76 (no connection point) | 0.50 (aligned with R1-R2 connection point) | 0.73 (no connection point) |
|  | cross-sectional area ratio of pin body to unprocessed portion of pin | 32% | 32% | 36% | 32% |
| Nose | pin nose length L | 20.0 mm | 24.1 mm | 25.0 mm | 27.9 mm |
| Shoulder | shoulder thickness t | 2.68 mm | 3.32 mm | 7.94 mm | 7.62 mm |
|  | shoulder angle | 5 degrees | 15 degrees | 10 degrees | 15 degrees |
| Thread portion | TPI (number of thread ridges/inch) | 5TPI | 5TPI | 4TPI | 4TPI |
|  | load flank angle β | −5 degree | −5 degree | −5 degree | −5 degree |
|  | stab flank angle γ | 25 degrees | 25 degrees | 15 degrees | 25 degrees |
|  | thread gap G | 0.03 mm | 0.11 mm | 0.06 mm | 0.09 mm |
| Thread portion | physical test sample | 0.305 mm | 0.305 mm | 0.381 mm | 0.381 mm |
|  | repeated make-up test sample | 0.127 mm | 0.127 mm | 0.178 mm | 0.178 mm |
| Contact pressure area | L3 (internal pressure, relative minimum value) | 151 | 120 | 158 | 120 |
|  | L18 (internal pressure, relative minimum value) | 126 | 100 | 132 | 100 |
|  | L15 (external pressure, relative minimum value) | 104 | 100 | 106 | 100 |
| Galling index (Relative maximum value) |  | 98 | 100 | 84 | 100 |
| Seal interference quantity | minimum value | 0.024 | 0.033 | 0.022 | 0.033 |
|  | maximum value | 0.046 | 0.045 | 0.051 | 0.045 |
|  | settable range | 0.022 | 0.012 | 0.029 | 0.012 |

REFERENCE SIGNS LIST 1 box component
3 pin (pin component)
5 female member (female member)
5a thread groove of female member
7 male member (male member)
7a thread ridge of male member
8 nose (pin nose)
11, 13, 40 seal (specifically, metal-to-metal seal)
12, 14 shoulder (specifically, torque shoulder)
18 load flank surface
19 stab flank surface
20 inner peripheral surface (tapered surface) of box component opposing the nose outer peripheral surface of pin component
30 nose outer peripheral surface of pin component (pin nose outer peripheral surface)
40a interference area

The invention claimed is:

1. A threaded joint for a pipe, comprising:
a pin component including (i) a male member, (ii) a nose extending from the male member to an end of the pin component, the nose including a cylindrical portion next to the male member, and (iii) a shoulder provided at the end of the pin component; and
a box component including (i) a female member configured to form a screw connection with the male member, (ii) a tapered inner peripheral surface that faces and comes into metal-to-metal contact with an outer peripheral surface of the nose when the female member and the male member form the screw connection, and (iii) a shoulder that contacts the shoulder of the pin component when the female member and the male member form the screw connection, wherein
the tapered inner peripheral surface of the box component has a surface with a consistent taper angle that spans a distance entirely from the cylindrical portion of the nose to the end of the pin component when the male member and the female member form the screw connection,
the tapered inner peripheral surface of the box component interferes with the outer peripheral surface of the nose and a seal surface is formed at a contact interface therebetween when the female member and the male member form the screw connection,
the outer peripheral surface of the nose has an outward convex curve in an axial cross sectional view of the pin component, the convex curve is comprised of a composite curve including a plurality of outward convex arcs each having different radiuses of curvature, and:

(i) the arcs are connected in sequence on the outer peripheral surface of the nose,
(ii) one of the arcs is connected to the cylindrical portion of the male member, and
(iii) the arcs are each curved so that the radius of curvature of the respective arcs increases with distance from the male member.

2. The threaded joint for a pipe according to claim 1, wherein acute angles formed by radii at a center point of the individual arcs in the composite curve form relative to a longitudinal axis of the pin component increase with decreasing distance from the male member.

3. The threaded joint for a pipe according to claim 1, wherein adjacent arcs of the plurality of arcs are connected to each other at connection points, and the connection points in the composite curve each are configured to form a point of contact between the outer peripheral surface of the nose and the tapered inner peripheral surface of the box component when the female member and the male member form the screw connection.

4. The threaded joint for a pipe according to claim 1, wherein the tapered inner peripheral surface of the box component forms an angle with a center axial direction of the box component that is ten degrees or less.

5. The threaded joint for a pipe according to claim 1, wherein the nose of the pin component has a length of 20 mm or more.

6. The threaded joint for a pipe according to claim 1, wherein threads of the male member and grooves of the female member form a stab flank angle when the female member and the male member form the screw connection and the stab flank angle is from zero degrees to 30 degrees.

7. The threaded joint for a pipe according to claim 1, wherein threads of the male member and grooves of the female member form a load flank angle when the female member and the male member form the screw connection and the load flank angle is from −5 degrees to 4 degrees.

8. The threaded joint for a pipe according to claim 1, wherein the shoulder of the pin component forms an angle with a joint-axis orthogonal surface of the threaded joint that is from zero degrees to 20 degrees.

9. The threaded joint for a pipe according to claim 1, wherein threads of the male member and grooves of the female member form a thread gap between the male member and the female member when the female member and the male member form the screw connection, and a length of the thread gap is from 0.01 to 0.1 mm.

10. The threaded joint for a pipe according to claim 1, wherein the arcs of the plurality of arcs each have a length of 2.5 mm or less.

11. The threaded joint for a pipe according to claim 1, wherein the arcs of the plurality of arcs each have a length of 2.5 mm or less and a radius of 250 mm or more, and the radius of an arc closer to the shoulder of the pin component is three times or more the radius of an adjacent arc closer to the male member.

12. The threaded joint of a pipe according to claim 1, wherein the pin component includes at least three outward convex arcs.

13. The threaded joint for a pipe according to claim 1, wherein at least one of the plurality of outward convex arcs is two or more inches and the remaining arcs are less than two inches.

* * * * *